United States Patent
Northrop et al.

(10) Patent No.: US 8,133,302 B2
(45) Date of Patent: Mar. 13, 2012

(54) PROCESS FOR PURIFICATION OF HYDROCARBONS

(75) Inventors: Paul S. Northrop, Spring, TX (US); Narasimhan Sundaram, Fairfax, VA (US)

(73) Assignee: ExxonMobil Upstream Research Company, Houston, TX (US)

( * ) Notice: Subject to any disclaimer, the term of this patent is extended or adjusted under 35 U.S.C. 154(b) by 280 days.

(21) Appl. No.: 12/593,534

(22) PCT Filed: Apr. 25, 2008

(86) PCT No.: PCT/US2008/005402
§ 371 (c)(1),
(2), (4) Date: Sep. 28, 2009

(87) PCT Pub. No.: WO2008/156524
PCT Pub. Date: Dec. 24, 2008

(65) Prior Publication Data
US 2010/0121126 A1    May 13, 2010

Related U.S. Application Data

(60) Provisional application No. 60/934,504, filed on Jun. 14, 2007.

(51) Int. Cl.
*C07C 7/12* (2006.01)
*B01D 53/22* (2006.01)
(52) U.S. Cl. .......... 95/55; 95/135; 95/148; 96/132; 208/208 R; 585/820; 423/230
(58) Field of Classification Search ...... 95/55, 135–137, 95/148; 96/132, 134, 135, 153; 208/208 R; 585/800, 820; 422/600; 423/230
See application file for complete search history.

(56) References Cited

U.S. PATENT DOCUMENTS

| 3,591,489 A | 7/1971 | Adams et al. |
| 4,187,282 A * | 2/1980 | Matsuda et al. ........... 423/244.1 |
| 4,259,301 A | 3/1981 | Say |

(Continued)

FOREIGN PATENT DOCUMENTS

GB    970567    9/1964

(Continued)

OTHER PUBLICATIONS

Northrop, P. S. et al., "Modified cycles, adsorbents improve gas treatment, increase mol-sieve life", Oil & Gas Journal, Aug. 4, 2008, pp. 54-60.

(Continued)

*Primary Examiner* — Frank Lawrence, Jr.
(74) *Attorney, Agent, or Firm* — Law Dept.

(57) ABSTRACT

The present invention relates to a process for the removal of sulfur contaminants from a hydrocarbon stream comprising: (a) providing a gaseous hydrocarbon stream having sulfur contaminants, but having less than 10 ppmw of said sulfur contaminants as thiophenes, to a bed of adsorbent material, said material having at least one Group VIII metal compound with at least one Group VI, IA, IIA, IB metal compound on an inorganic metal oxide support material, without substantial added hydrogen, to absorb said contaminants; (b) periodically stopping said providing of said gaseous hydrocarbon feed stream of (a); (c) then, regenerating said adsorbent bed by introducing at least one regenerant, in any order, in the place of said stream; and, (d) continuing to alternate (a) and (b) plus (c) as needed.

23 Claims, 3 Drawing Sheets

U.S. PATENT DOCUMENTS

| | | | |
|---|---|---|---|
| 4,313,820 A * | 2/1982 | Farha et al. | 208/213 |
| 5,110,569 A | 5/1992 | Jain | |
| 5,157,201 A | 10/1992 | Norris | |
| 5,474,670 A | 12/1995 | Daage et al. | |
| 5,512,082 A | 4/1996 | Zarchy et al. | |
| 5,739,391 A | 4/1998 | Ruppel et al. | |
| 5,763,350 A | 6/1998 | Immel et al. | |
| 6,152,987 A | 11/2000 | Ma et al. | |
| 6,579,444 B2 | 6/2003 | Feimer et al. | |
| 6,649,043 B1 * | 11/2003 | Chen et al. | 208/213 |
| 6,843,907 B1 | 1/2005 | Kanazirev et al. | |
| 7,074,324 B2 | 7/2006 | Feimer et al. | |
| 2002/0043484 A1 * | 4/2002 | Khare | 208/244 |
| 2005/0029162 A1 | 2/2005 | Shih et al. | |
| 2006/0035784 A1 | 2/2006 | Wessel et al. | |
| 2006/0151359 A1 | 7/2006 | Ellis et al. | |

FOREIGN PATENT DOCUMENTS

| | | |
|---|---|---|
| GB | 2 275 625 A | 9/1994 |
| WO | WO 02/08361 A1 | 1/2002 |
| WO | WO 2004/039926 A1 | 5/2004 |
| WO | WO 2006/007034 A1 | 1/2006 |
| WO | WO 2006/124796 A3 | 11/2006 |

OTHER PUBLICATIONS

European Search Report No. 115622, May 13, 2008, 3 pages.

* cited by examiner

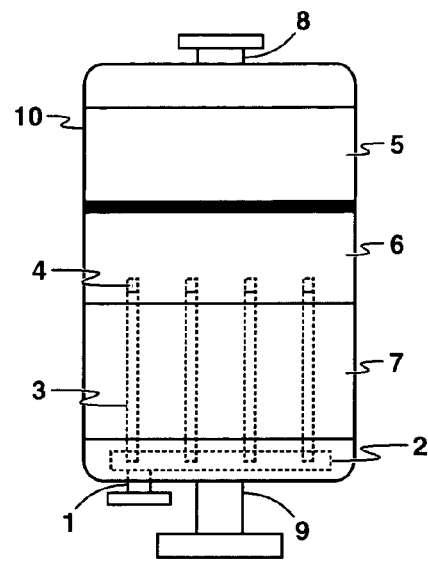
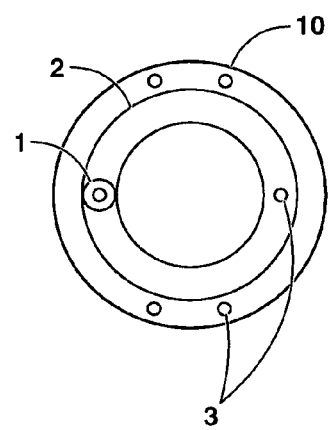
FIG. 2  FIG. 3
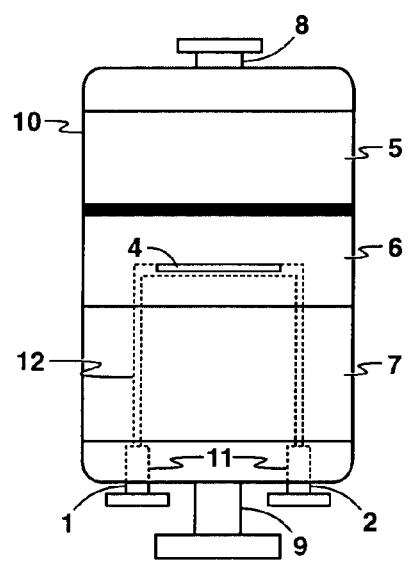
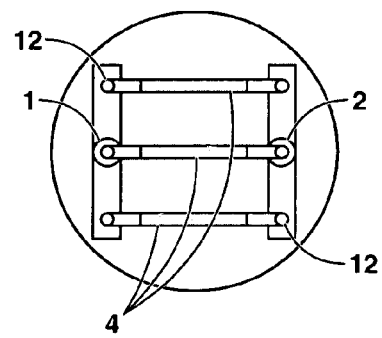
FIG. 4  FIG. 5

PROCESS FOR PURIFICATION OF HYDROCARBONS

PRIORITY CLAIM

This application is the National Stage of International Application No. PCT/US2008/005402, filed 25 Apr. 2008, which claims the benefit of U.S. Provisional Application No. 60/934,504, filed 14 Jun. 2007.

TECHNICAL FIELD

Embodiments of the invention relate generally to the purification of hydrocarbon streams, in particular to the purification of raw natural gas streams for use in the production of liquefied natural gas (LNG). Specifically, embodiments of the invention relate to the use of adsorbents to purify hydrocarbon streams and to an improved method for regenerating such adsorbents.

BACKGROUND

Raw natural gas and other hydrocarbon streams often contain naturally occurring contaminants, such as, for example, water vapor, $CO_2$, $H_2S$, and mercaptans, and other sulfur compounds. In the case of raw natural gas, other contaminants, such as methanol or glycol, are sometimes purposely added at the natural gas field production facility to prevent the formation of hydrates or ice in the natural gas production stream while it is in transit to the treating facility. Whether such contaminants occur naturally in the gas or are purposely added, they must be substantially removed prior to use of the natural gas in certain industrial or residential applications.

One method of removing sulfur contaminants from liquid hydrocarbon streams in the refining industry includes passing the streams over beds of metal impregnated adsorbents. In U.S. Pat. No. 5,157,201 metal oxides are used to adsorb sulfur from a propylene/propane stream without using hydrogen. An olefin stream is heated to about 50° C. to 175° C. at a pressure of about 175 psig to 1100 psig and passed over a commercial CoMo (cobalt-molybdenum) oxide adsorbent to remove sulfur contaminants. The adsorbents are said to be regenerable using a mixture of air and steam at 400° C. In U.S. Pat. No. 6,579,444 hydrocarbon streams boiling in the naphtha range have sulfur compounds removed by a first step of hydrodesulfurization in the presence of any of a number of metal compounds (preferably cobalt and molybdenum sulfided compounds) and a second step of contacting the streams with adsorbents comprised of cobalt and at least one of molybdenum or tungsten (principally the metal oxides) on a refractory support at temperatures of, preferably 10° C. to 100° C., and pressures of from atmospheric to about 500 psig. Regeneration is with any suitable regenerant, including nitrogen, a mixture of hydrogen and hydrogen sulfide, as well as organic solvents, both aromatic and non-aromatic. U.S. Pat. No. 7,074,324 teaches the removal of sulfur compounds from hydrocarbon streams, especially gasoline, by contacting with adsorbent materials that are regenerated with hydrogen or a hydrogen/$H_2S$ mixture. The adsorbent material is selected from any hydrotreatment compound containing a least one Group VIII metal, preferably selected from Fe, Co and Ni, alone or in combination with at least one Group VI, IA, IIA, IB, or mixtures, preferably supported, e.g., on alumina. Preferably the compound is CoMo, and supports generally include zeolitic compounds. Regeneration uses hydrodesulfurization conditions, e.g., pressures from about 0 to about 2,000 psig and temperatures from about 100° C. to about 600° C.

Principal methods of removing contaminants from gaseous hydrocarbon streams, including raw natural gas streams, involve the use of solid adsorbents which include, for example, alumina, silica gel, activated carbon and molecular sieves such as zeolites. These materials are typically used in packed beds. Typically, a contaminated hydrocarbon stream is passed through the bed and the adsorbent materials in the beds adsorb the contaminants preferentially, thereby reducing their concentration in the hydrocarbon stream effluent emerging from the bed.

The adsorbents eventually become saturated with adsorbed contaminants, at which point the adsorbent will no longer effectively remove the contaminants from the hydrocarbon stream. When saturation occurs, the adsorbent materials must be either replaced or regenerated. One way of regenerating an adsorbent is to pass a heated regeneration fluid stream, either in a gaseous or a liquid state, through the adsorbent bed, often in a countercurrent manner. In this way, the adsorbed contaminants are desorbed from the adsorbent and moved into the regeneration fluid stream in which they are carried out of the bed. The regeneration fluid stream can then be purified and recycled, or it can be used as fuel gas.

During regeneration, temperatures in the beds can often reach approximately 600° F. (315.6° C.). At these temperatures, particularly in the case of zeolitic molecular sieves, some adsorbed species may "crack" to form highly carbonaceous compounds, or "coke." For example, while water and some other compounds are simply desorbed from the molecular sieves during regeneration, alcohols, glycols, heavy hydrocarbons such as benzene, toluene, and xylenes, mercaptans, and organic sulfides and disulfides may be subject to cracking on molecular sieves during regeneration. Under the acidic conditions of a typical mole sieve, the mercaptans may form higher molecular weight species, and these species may then dehydrogenate to form coke. Thus the mercaptans may be decomposed into the corresponding olefins (R') and hydrogen sulfide:

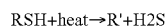

$$RSH + heat \rightarrow R' + H2S$$

In the case of methanethiol, R' may represent a methylene radical. Two methylene radicals may combine to form ethylene, which may then form any number of polymers. These polymers may likewise dehydrogenate to form coke. Coke deposition on the mole sieve hinders gas flow (higher pressure drop), and inactivates the sorbent by physically blocking the micropores of the solid. The coke formed from such decomposition reactions builds up over repeated thermal regeneration cycles, thereby hindering fluid flow through the molecular sieve bed, eventually rendering it ineffective. When this occurs, the molecular sieves can no longer be regenerated and must be replaced at potentially significant expense, including possibly expenses incurred from unplanned downtime for the hydrocarbon purification facility.

In addition to deactivation by coking, molecular sieves can also undergo thermal deactivation. For this reason, it would be desirable to use a low regeneration temperature. If the regeneration temperature is too low, however, the quality of the product obtained from the regenerated molecular sieves may be inadequate. That is, if the regeneration temperature is too low to sufficiently desorb contaminants on the molecular sieves, the absorptive capacity of the regenerated molecular sieves will be low and the natural gas product or other fluid product obtained by treatment with such molecular sieves will have a contaminant level that is unacceptably high.

Accordingly, embodiments of the present invention provide an improved method of removing contaminants from hydrocarbon streams using molecular sieves and an improved method of regenerating the molecular sieves while reducing the adsorption of carbon-containing contaminants and resulting coking. Other embodiments incorporate such improved methods in a method for producing liquefied natural gas (LNG).

SUMMARY OF THE INVENTION

The present invention is a process for the removal of sulfur contaminants from industrial gases, particularly natural gas at remote locations where liquefaction may be or may become a preferred means of packaging the natural gas for transport to locations where it can be used more efficiently, or more effectively. Specifically the invention relates to a process for the removal of sulfur contaminants from a hydrocarbon stream comprising: (a) providing a gaseous hydrocarbon stream having sulfur contaminants but having less than 10 ppmw of said sulfur contaminants as thiophenes to a bed of adsorbent material, said material having at least one Group VIII metal compound with a at least one Group VI, IA, IIA, IB metal compound on an inorganic metal oxide support material, at a temperature up to about 150° C. and about 1 bar (100 kPa) to about 200 bar (20,000 kPa), without substantial added hydrogen, to absorb said contaminants; (b) periodically stopping said providing of said gaseous hydrocarbon feed stream of (a) when said contaminates begin to increase in said treated gaseous hydrocarbon feed stream to a level not greater than 300 ppmw; (c) then, regenerating said adsorbent bed by introducing at least one regenerate, in any order, in the place of said stream, either in a concurrent or countercurrent direction, to at least said adsorbent bed for a period of time sufficient to regenerate a majority of adsorbed contaminates in the adsorbent material; and, (d) continuing to alternate (a) and (b) plus (c) as needed to maintain a sulfur contaminant level of less than 300 ppmw. In preferred embodiments, in step (b), after a first step (a), the regeneration follows with one of said regenerants, optionally then followed by a second part of steps (b) plus (c) where a different regenerant is used, with further optional regeneration steps with a same or different regenerant, before resuming the passing of said hydrocarbon stream over the sulfided adsorbent bed. In the alternation of step (d), the steps of (b) plus (c) will comprise at least one use of regenerant, and preferably more, for example 2-4 regenerants, in any order.

In further preferred embodiments the invention process is one additionally comprising passing said hydrocarbon stream through a multi-bed reaction vessel, comprising at least one adsorbent bed of (a) and one or more other contaminate-removal beds of materials for the adsorption and removal of water, alcohol, oxygenate and nitrogenate contaminant compounds, said bed(s) being contiguous or separate from the at least one adsorbent bed(s) of (a) above, and from each other, if more than one. The invention further includes the multi-bed reaction vessel comprising a delivery system that delivers hydrogen regenerant directly to each of the one or more adsorbent beds of (a) such that the hydrogen passes through the (a) bed(s) and is largely consumed therein.

In yet another embodiment of the invention, an apparatus for the removal of contaminants from a hydrocarbon stream is provided. The apparatus comprises: a) a vessel having at least first, second, and third zones, a gaseous hydrocarbon stream inlet, and a gaseous hydrocarbon stream outlet, wherein the gaseous hydrocarbon stream inlet is in fluid communication with each of the first, second and third zones and the gaseous hydrocarbon stream outlet; and b) a regenerant stream inlet operably attached to at least one regenerant stream conduit having at least one opening in the second zone covered by a semi-permeable material, wherein the at least one regenerant stream conduit is substantially impermeable in each of the first and third zones.

BRIEF DESCRIPTION OF THE DRAWINGS

The foregoing and other advantages of the present invention may become apparent upon reviewing the following detailed description and drawings of non-limiting examples of embodiments in which:

FIG. 2 shows one embodiment of delivery of regenerant like hydrogen in a side view.

FIG. 3 is a top view of the embodiment in FIG. 2.

FIG. 4 is another embodiment where regenerant passes through a U-shape through the vessel.

FIG. 5 is a top view of the embodiment in FIG. 4.

DETAILED DESCRIPTION

Figure 1:
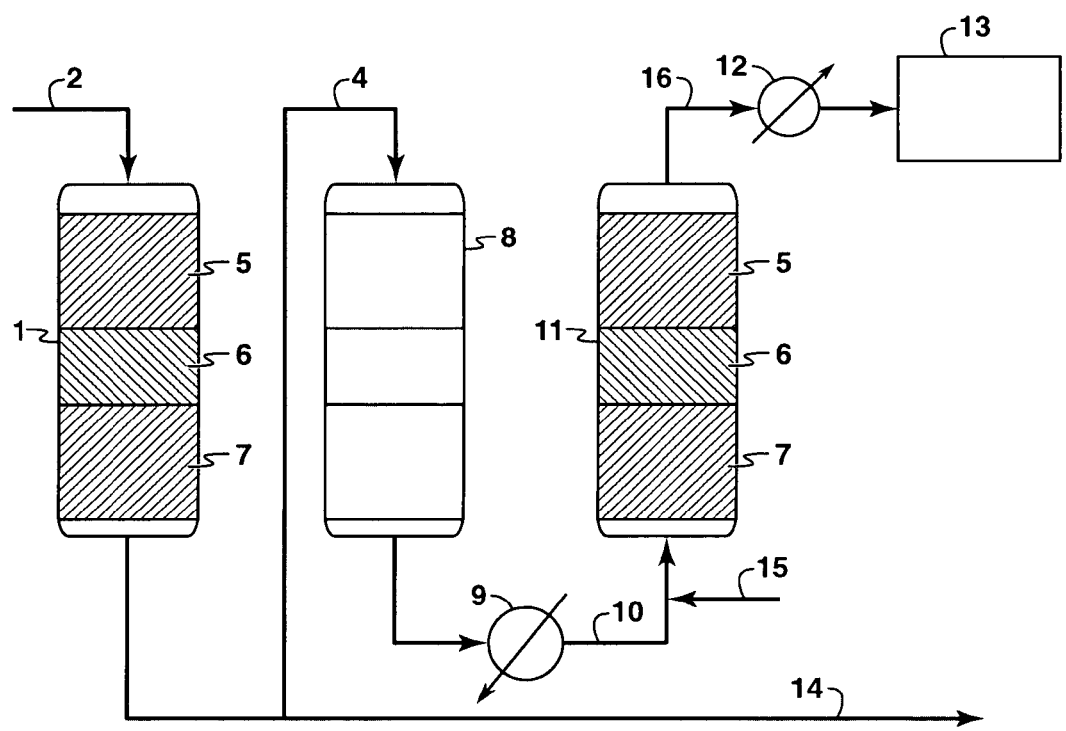
FIG. 1 shows typical adsorber and associated equipment that can be used in embodiments for practicing the invention process.

In the following detailed description section, the specific embodiments of the present invention are described in connection with preferred embodiments. However, to the extent that the following description is specific to a particular embodiment or a particular use of the present invention, this is intended to be for exemplary, purposes only and simply provides a description of the exemplary embodiments. Accordingly, the invention is not limited to the specific embodiments described below, but rather, it includes all alternatives, modifications, and equivalents falling within the true spirit and scope of the appended claims.

Throughout this description and claims the term "ppmw" will be used when specifying contaminate contents to mean parts per million by weight, based upon the total weight of the components of the stream under discussion.

This invention relates to the use of oxide and/or sulfided cobalt-molybdenum (CoMo) metal compound adsorbent materials and regeneration methods in a cyclic process that selectively adsorbs mercaptans from a gaseous stream and subsequently desorbs or deactivates the adsorbed mercaptans to allow continued processing without a need to change the adsorption bed materials. The process thereby enables efficient re-use of adsorbent materials which can be an economic requirement when treating larger flow streams (0.5-2 GSCFD, or 566-2260 kNm$^3$/hr)(kNm$^3$ means here kilo ($10^3$) normal meters cubed where "normal" is defined as under condition of temperature 0° C. and pressure at 101.32 kPa. Such volumes are typical of gas plants currently being planned and built.

Though the adsorption bed materials are often referred to in this description and claims as a adsorbent, or adsorbent materials, these materials are used solely for adsorption of the mercaptans of the feed stream, and do not facilitate any catalytic chemical reaction with such during said adsorption.

The CoMo adsorbent materials of the invention can be, for example, sulfided forms of catalyst that are common in refining hydrotreatment applications. In particular, the adsorbents of this invention contain metal compounds as either oxide and/or sulfided forms. Historically, for example, sulfided forms of CoMo metal compounds have been used as hydrogenation catalysts in the refinery. They have been used somewhat successfully in the catalytic hydrogenation of gas-phase mercaptans at moderate temperatures (~300° C.) in tail gas treating units of Claus sulfur recovery plants or in hydrotreating, such as hydrodesulfurization, see U.S. Pat. No. 6,579,444 above. The invention processes proposed here also permit repeated use of such "spent" catalyst materials, which may no longer be effective as hydrotreatment catalysts, to continue to be used as trace sulfur adsorbents. Such trace sulfur removal is important for example, to meet ever-more-stringent petroleum-based fuel product sulfur specifications, and there is significant incentive to reduce cost or increase service life of adsorbent raw materials.

Generally speaking, adsorbents suitable for removal of sulfur contaminants from hydrocarbon streams in accordance with the invention include those comprising at least one Group VIII metal compound such as Co, Ni and Fe, alone or in combination with a component of at least one metal compound selected from Group VI, IA, IIA, IB metals and mixture thereof, supported on any suitable, high surface area inorganic metal oxide support material such as, but not limited to, alumina, silica, titania, magnesia, silica-alumina, and the like. The Group VIII metal component will typically comprise a component of Co, Ni or Fe, more preferably Co and/or Ni, and most preferably Co; and at least one Group VI metal component, preferably Mo or W, and most preferably Mo, supported on a high surface area support molecular sieve. All Groups of the Periodic Table referred to herein mean Groups as found in the Sargent-Welch Periodic Table of the Elements, copyrighted in 1968 by the Sargent-Welch Scientific Company. The support molecular sieves employ one or more zeolite components.

In the practice of the invention it is preferred that the adsorbent comprise the cobalt and molybdenum oxide or sulfide compounds on the support material. Metal concentrations are typically those existing in conventional hydroprocessing catalyst compounds and can range from about 0.1-30 wt. % of the metal oxide, and more typically from about 4-28 wt. % of the oxide of the catalytic metal components, based on the total adsorbent weight. The adsorbent may be pre-sulfided or sulfided in-situ, by well-known and conventional methods. At least partially and even severely deactivated adsorbents from prior use in removal of sulfur compounds by hydrotreating (hydrodesulfurization, "BIDS") have been found to be selective in removing sulfur with less hydrocarbon adsorption, and resulting lesser coking.

The adsorbent metal compounds can be deposited or incorporated upon the support by any suitable conventional means, such as by impregnation employing heat-decomposable salts of the cobalt and molybdenum metals or other methods known to those skilled in the art, such as ion-exchange, with impregnation methods being preferred. Suitable aqueous impregnation solutions include, but are not limited to a nitrate, ammoniated oxide, formate, acetate and the like. Impregnation of the metal components can be employed by incipient wetness, impregnation from aqueous or organic media, or compositing. Impregnation as in incipient wetness, with or without drying and calcining after each impregnation, is typically used. The support is precalcined and the amount of water to be added to just wet all of the support is determined. The aqueous impregnation solutions are added such that the aqueous solution contains the total amount of metal component to be deposited on the given mass of support. Impregnation can be performed for each metal separately, including an intervening drying step between impregnations, or a single co-impregnation step can be used. The saturated support can then be separated, drained, and dried in preparation for calcination. Calcination is generally achieved in air at temperatures of from 260-650° C., with temperatures of from 425-590° C. being typical.

Suitable refractory supports include zeolite compounds. Zeolites that can be employed in accordance with this invention include both natural and synthetic zeolites. Such zeolites include gmelinite, chabazite, dachiardite, clinoptilolite, faujasite, heulandite, levynite, erionite, cancrinite, scolecite, offretite, mordenite, and ferrierite. Included among the synthetic zeolites are zeolites X, Y, L, ZK-4, ZK-5, E, H, J, M, Q, T, Z, alpha and beta, ZSM-types and omega. Preferred are the faujasites, particularly zeolite Y and zeolite X, more preferably those having a unit cell size greater than or equal to 6 Angstroms in diameter, most preferably greater than or equal to 10 Angstroms, in diameter. The aluminum in the zeolite, as well as the silicon component can be substituted with other framework components. For example, at least a portion of the aluminum can be replaced by boron, gallium, titanium or trivalent metal compositions that are heavier than aluminum. Germanium can be used to replace at least a portion of the silicon portion. Preferred supports are alumina, silica, alumina-silica, and, particularly, large pore zeolites. Particularly preferred adsorption adsorbents according to the invention include the commercial HDS adsorbents KF-752, KF-756 and KF-757 from Albemarle Corp.

In a preferred embodiment, the supported metal adsorbent material is sulfided, if not previously used for HDS processing and being reused for the adsorption process described. Sulfiding of new or fresh adsorbent can be accomplished by subjecting the metal oxide/support comprising adsorbent to contact with hydrogen sulfide, or a mix of hydrogen sulfide with hydrogen, for a period of time of from about 600 minutes to about 1,000 minutes at temperatures of about 200° C. to about 700° C., under pressures of about 50 psig (300 kPa) to about 500 psig (3,000 kPa).

The present invention, with respect to adsorption, is practiced by introducing the feedstock containing the sulfur compounds into an adsorption zone containing a bed of adsorbent material at suitable conditions. Suitable conditions include temperatures up to about 150° C., preferably from about −30° C. to about 150° C., more preferably from about 10° C. to about 100° C., and most preferably about 5° C. to about 100° C. Suitable pressures are from about atmospheric pressure to about 1000 psig (6894 kPa), preferably from about atmospheric pressure to about 250 psig (1,724 kPa). The bed of adsorbent material can be of any suitable arrangement including fixed bed, slurry bed, moving bed, or ebullating bed. It is preferred that the adsorbent material be arranged as a fixed bed.

The adsorbent can be regenerated by any suitable material that will desorb the sulfur compounds from the adsorbent. Regeneration methods are generally known in the art. Possible methods include thermal swing, pressure swing, and modified partial desorption regeneration, or combinations thereof. Typical regeneration streams (or "desorbents") include nitrogen, a mixture of hydrogen and hydrogen sulfide, as well as organic solvents, both aromatic and non-aromatic, and mixes. The desorbent can also be a refinery stream. It is preferred that a desorbent be used that can be easily separated from the sulfur compounds by conventional techniques, such as by hydrodesulfurization or distillation. If the selected separation technique is distillation, the boiling point of the desorbent should differ from the sulfur compounds by at least about 5° C., preferably by at least about 10° C. Preferred desorbents include nitrogen and mixtures of hydrogen and hydrogen sulfide.

For the continuous process according to the invention, the regeneration methods are used in a cyclic process, that is, regeneration is repeated on a regular basis throughout the sulfur removal process as a whole. As discussed above, during the invention adsorption step, (a), there will be some decline of adsorbent effectiveness as determined by analysis of remaining sulfur contaminants in the treated process stream exiting from the adsorption bed or zone. Thus, in adsorption processing, when the content of sulfur contaminants in the treated effluent begins to increase to pre-adsorption entering levels ('breakthrough'), or even well prior to that where exiting levels are intolerably high, i.e., when reaching a level not greater than about 300 ppmw, preferably 200 ppmw or even more preferably less than about 100 ppmw or even 30 ppmw or 10 ppmw, the feed stream is stopped, and regeneration is begun. Regeneration can comprise introducing the regenerant to the bed(s), specifically to the adsorbent bed(s), in a concurrent or counter-current direction from that used by the now stopped feed stream.

The regenerant preferably includes the use of hydrogen, and at least one or more of nitrogen and organic solvents. The use can be in series during one feed stream stoppage period, or may be with any individual or any combination of regenerants over a series of stoppages. This can be illustrated using the following representations: feed stream adsorption=F; hydrogenation, introduction of hydrogen, or hydrogen combined with hydrogen sulfide=H; and, introduction of hot nitrogen gas, organic solvents, such as petrochemical liquids, and the like=P. A series of segments of the invention continuous process is then represented as: H-FP-FP-FP-FP-FH-FP-FP-FP-FP-FH- . . . . As illustrated, hydrogenation, and/or sulfiding with a mix of hydrogen with hydrogen sulfide is preferred as an initial step. Thereafter, the hydrogenation, and/or sulfiding, is conducted regularly, or intermittently, with the interspersed use of another regenerant at least once, preferably more than once, during a series of stoppages making up the continuous process. The duration of the individual steps and the number of times they are used can vary. For example, hydrogen regeneration may be applied only after 10 or 20 P regeneration steps. This intermittent application also does not have to be uniformly applied, i.e. a single or multiple hydrogen regeneration steps can be applied first after x regeneration steps with regenerant P and subsequently after y regenerations with regenerant P where x and y are integers between 1 and 20, for example. Because hydrogenation may be expensive or limited in availability, its intermittent use in the invention process serves to reduce overall costs of the process.

Other embodiments of combined regeneration are also possible. One example of this is combining one regeneration step to include successive use of different regenerants during any one stoppage of the desorption step. This is illustrated for example by the symbols: H-FH-FPH-FP-FPP-FPHPH-FHP . . . , where the order of the regenerant to be used can be varied to include one or more regenerant, in any order if more than one. The selection of P in the illustrated regenerations may be of one or more of the hot nitrogen gas, organic solvents, and petrochemical liquids, combined or individually in series, etc. A preferred petrochemical liquid, or organic solvent, is one used in the refining industries comprising 70% by weight $C_6$-$C_{12}$ aromatic compounds and 30% by weight $C_3$-$C_{10}$ paraffinic compounds, hereinafter called "powerformate".

Since raw natural gas often contains impurities in addition to the mercaptans (notably water vapor, $CO_2$, $H_2S$, and other trace sulfur compounds) that must be removed at least to some extent prior to industrial or residential use, the invention process includes in a preferred embodiment a multi-bed, or multi-level reactor comprising the one or more adsorbent beds of the invention plus one or more other beds suitable for removal of these additional impurities. The multi-bed reactor may be arranged with two or more beds in a vertical arrangement, or a horizontal one. Typically said beds will each be beds of active or activated materials comprising particles or other materials effective for adsorbing one or more of the impurities of the natural gas feed stream, and physical means for fixing said materials within a given level or section. The use of perforated trays, perforated compartments, small mesh screens, and the like are all well-known in the chemical processing industries. Such are used to allow the passage of the natural gas feed stream through each level or section with effective path-creating physical means, or particle bed passageways, to assure effective contact of the natural gas components with a maximum number of impurity-absorbing sites comprised in the level or section.

Typical multi-bed reactors are exemplified in U.S. Pat. No. 5,110,569, which is incorporated by reference in accordance with U.S. patent practice. There impurities are being removed from nitrogen gas prior to cryogenic cooling by use of 3-level beds. Here impurities are removed in a first level, a reaction for remaining impurities is conducted by catalysis in a second level, and the reaction products from the second level are removed in the third level. Effective means for purging the collected impurities are also described and illustrated. By timed opening and closing of supply lines carrying respectively, feed gas and purge gas, operations are continued with periodic desorption from the various levels of adsorbed impurities. This description can be usefully adapted to the current invention but where a hydrocarbon gas feed stream replaces the nitrogen gas, defined regenerants replace the purge gases, and no catalysis reaction of the feed stream takes place in the adsorbent bed or level. There of course may be a hydrogenation reaction during the hydrogen use for reactivating or regenerating the adsorption adsorbents, adsorbent bed, or adsorbent materials. Catalysis can occur when hydrogenation conditions are used during, regeneration, but there is no significant hydrodesulfurization of the hydrocarbon stream since the hydrocarbon stream generally will be substantially stopped during the regeneration steps.

Referring now to FIG. 1, we depict a adsorber and associated equipment that can be used in various embodiments of the invention. Raw gas to be treated enters vessel 1 as stream 2. One example conditions of stream 2 are about 340 kNm³/hr (300 MMSCFD) of a raw (contaminate containing) natural gas at $66.5 \times 10^3$ kPa (965 psia) and 25° C. (77° F.), comprising most light hydrocarbons, e.g., 86 mol. % methane, 5 mol. % ethane, and lesser amounts of heavier hydrocarbons, e.g., 2 mol. % propane, 1 mol. % butane, 0.35 mol. % pentane, and 0.1 mol. % hexane, the remaining contents being mixed $C_7$+ hydrocarbons. This stream 2 may contain approximately 780 ppmv water and 50-5000 ppmv sulfur compounds as contaminants. Separate levels containing treatment materials of the same, similar, or different functioning materials are compartmented in vessel 1, in sections 5, 6, and 7. For example, level 5 can contain desiccants to perform water and moisture removal, level 6 can contain the adsorption adsorbents to remove sulfur in accordance with the invention, and level 7 can contain additional desiccants for additional moisture removal level 5 may contain guard layers to remove other contaminates such as methanol, glycol, corrosion inhibitor, drilling mud, or other aerosol carryover from a natural gas well field, etc., from the feed stream level 7 may contain guard layers for the regenerant streams as needed. Such guard layers typically can comprise activated carbon and carbon impregnated with metals or metal compounds, or activated aluminas, as is well-known in the art. Although not shown in FIG. 1, treatment vessel 1 may be equipped with a bottom distributor plate for supporting the beds.

The raw gas stream passes through each of these material levels and exits as treated gas stream 14. In the illustrative example of FIG. 1, vessels 8 and 11, which also contain similarly disposed materials as in vessel 1, are treated in sequence. Typically, vessels in a system such as shown in FIG. 1 are either performing treatment or being prepared for treatment. Such preparation includes, for example, cooling as well as regeneration in accordance with the invention.

During a typical portion of this sequence, treated gas issues as stream 14 from vessel 1. Stream 14 typically would have flow rate, temperature and pressure approximately the same as stream 2. A slipstream 4 from stream 14 can be used as the regeneration fluid stream for vessels 8 and 11. This stream may be provided at a flow rate of about 34-110 kNm$^3$/hr (or about 30-100 MMSCFD), a pressure of 965-3000 kPa (140-435 psia), and a temperature about the same as streams 2 and 14. However, any suitable fluid or combination of fluids from other sources may be used in forming the regeneration fluid stream according to the invention. Such streams, either alone or in combination, may form all or part of the regeneration fluid stream or may be introduced into regeneration fluid stream 10 in any manner.

Typically, as shown in FIG. 1, treatment and regeneration flows are opposite in direction; however, they can also be in the same direction. When slipstream 4 forms all or a portion of regeneration fluid stream 10, prior to its introduction into vessel 11 containing the beds to be regenerated, slipstream 4 can be used to cool one or more recently regenerated adsorbent beds in vessel 8. In cooling such recently-regenerated beds, slipstream 4 is warmed to some extent. Slipstream 4 can then be further warmed by, for example, heat exchanger 9, if necessary, to reach the desired regeneration fluid stream temperature for use during the hot purge step. Fluid stream 10 from heater 9 has a temperature of 320° C. (600° F.), for example, before introduction into vessel 11, and has a molar flow rate and pressure similar to stream 4. As shown in FIG. 1, during the purge step, before regeneration fluid stream 10 reaches regeneration vessel 11, regenerant containing hydrogen is added via stream 15 to regeneration fluid stream 10.

Regeneration stream 15 can also be added directly into vessel 11 if needed and can be heated before introduction into vessel 11, if desired. This stream 15, which is the additional regenerant in accordance with the invention, can be at pressure, temperature and flow conditions in the ranges 1,000-3,000 kPa (140-435 psia), 30-320° C. (80-600° F.) and 1-10 kNm3/hr (0.88-8.8 MMSCFD), respectively. After exiting treatment vessel 11, the regeneration fluid stream 16 formed from regeneration streams 10 and 15 if, for example, 15 is introduced directly into vessel 11, may be cooled, if desired, in cooler 12 and then passed to regeneration fluid treatment facilities 13 where the fluids used in the regeneration may be purified, if needed. Stream 16 will be typically 35-120 kNm3/hr (31-106 MMSCFD) and at 300° C. (560° F.) and at 1,000-3,000 kPa. Purification of the regenerant is typically done by water washing, caustic treatment, or adsorption separation including pressure swing adsorption, or any combination of the foregoing.

The physical form of the desiccant material useful in embodiments of the invention is not critical. The desiccant materials may be in liquid form or in solid form, for example, in solid particulate or pellet form. "Solid" form materials as defined herein include solids that are porous or that have voids and/or interstices or the like throughout all or part of the material. Thus, it will be understood that the term "solid" does not necessarily denote a material that is uniformly solid and/or non-porous, although such materials are within the scope of solid materials that may be employed as the desiccant material. In the case where a particulate metal oxide is selected as the desiccant material, such as, for example, particulate alumina or silica, the average particle size of the desiccant material may be in the range of about 0.7 to about 6 mm, with a surface area of about 75 to about 500 m$^2$/gm. In some embodiments, the desiccant material is selected from the group consisting of alumina, silica gel, and titania. Where two or more adsorbent beds containing a desiccant material are used, the desiccant materials for each bed may be the same or different. For example, some embodiments utilize first and third adsorbent beds containing alumina as the desiccant material, with a second adsorbent bed containing molecular sieves located between the two alumina adsorbent beds. In still other embodiments the first bed contains silica gel and the third adsorbent bed contains a desiccant material comprising alumina. In some embodiments, the first adsorbent bed containing silica serves as a preliminary adsorbent bed (i.e., a preliminary adsorption bed) to remove substantial amounts of contaminants, such as methanol and water, before the contaminated hydrocarbon stream enters the molecular sieve bed.

In a preferred embodiment the invention process includes the multi-level reactor where regeneration is carried out in one or more steps (b) plus (c) using at least one delivery by-pass system that delivers hydrogen directly to each of the one or more adsorbent beds of (a) such that the hydrogen passes through the (a) bed(s). The by-pass delivery system comprises physical means that can be both substantially outside as well as substantially inside the contiguous or separate other bed(s) but constructed to restrict the hydrogen within it from coming into contact, either directly of indirectly, with said other beds. This is typically achieved where the delivery system has substantially impermeable surfaces that can be in contact with surrounding materials of the other beds, or atmosphere outside the reactor, and at least one surface that is permeable essentially only to hydrogen that is within the adsorbent bed (a). Such hydrogen-permeable surfaces are known, and can include membranes fabricated from small pore zeolites (e.g., about 2 Å pore diameter) and/or non-porous metallic palladium. The hydrogen is typically delivered at temperatures of about 200° C. to 700° C. and pressures of from about 20 psig (100 kPa) to about 2000 psig (1000 kPa) and about 0.01 SCFM (0.3 SLPM (standard liters per minute)) to about 100 SCFM (3000 SLPM) flow rate. Though the flow of hydrogen will be sufficient to largely deactivate/desorb the sulfur contaminants and can be largely consumed within the respective adsorbent bed of (a), any excess hydrogen that flows over into contiguous other beds will not present major difficulties therein. The cost and availability of hydrogen will be the major variables to consider, along with the empirical determination of the hydrogen needed to return the adsorbent beds to nearly original effectiveness in terms of treated natural gas mercaptan content.

If nitrogen is desired as an inert regenerant, a selectively permeable membrane to separate air may similarly be used. Silica or silica-alumina composite membranes are preferred over the palladium filter for selective delivery of nitrogen to regenerate specific regions of adsorbent. In addition, the nitrogen for such application may itself be produced by in-situ separation of air for example, using either pressure swing adsorption (PSA) or membranous filters (e.g. polymeric membranes) to selectively remove oxygen from air, thereby increasing nitrogen content. In the latter case, a shell and tube configuration can be used, for example, to provide separate pathways for oxygen and enriched nitrogen. In one such in-situ embodiment, the membrane filters are placed in the bypass delivery system at a location upstream of the aforementioned silica membrane. The bypass delivery system serves as a receptacle for the nitrogen enriching medium (polymer membrane) and is also capable of insulating the materials from extreme, elevated temperatures if these are applied during regeneration.

Turning now to FIGS. 2-6, we illustrate alternative embodiments for providing hydrogen directly to the adsorbent beds used for mercaptan adsorption and removal. In FIG. 2, feed gas contaminated with components like mercaptans (which may be feed gas 2 disclosed in FIG. 1) enters adsorber vessel 10 through conduit 8 and leaves after purification through conduit 9. Vessel 10 has several adsorber materials for example FIG. 2 shows three layers denoted 5, 6, 7 disposed in it. Note that layers 5, 6, and 7 may comprise the same or similar materials as sections 5, 6, and 7 disclosed in FIG. 1. Regenerant enters through conduit 1 and is distributed through manifold 2 to a plurality of tubes 3 which are disposed uniformly or otherwise throughout the vessel cross-section (FIG. 3). Regenerant selectively passes through semi-permeable material 4. Similar or other regenerants can also enter 10 through conduit 9. Regenerants pass out of vessel 10 through conduit 8.

FIGS. 4 and 5 show regenerant can enter conduit 1, pass through manifold 11 where it is distributed into tubes or similar delivery means 12 which have U-shape and a permeable section shown for example as 4, which can be membranous in nature, and pass out of vessel 10 through manifold 11 and conduit 2. Construction of manifold 11 can have any shape; only one example is depicted in FIG. 5. The embodiment of FIG. 4 is useful when regenerant such as hydrogen is available at a lower concentration in the vicinity of vessel 10. Similar or other regenerants can also enter vessel 10 through conduit 9 and simultaneously or otherwise pass out of vessel 10 through conduit 8. Direction of flows can be reversed in each instance so that regenerants can also enter via conduit 2 or 8 and leave via 1 or 9. Similarly, feed can enter through conduit 9 and leave via conduit 8. Typically, regenerants are opposite in flow direction.

Figure 6:
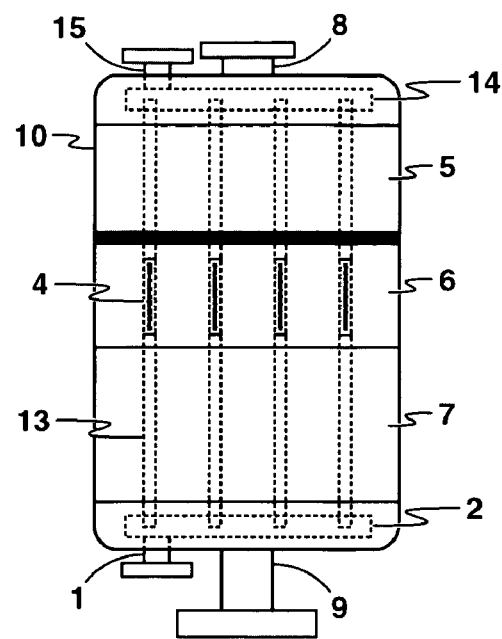
FIG. 6 shows another embodiment where tubes pass completely through all the materials but have selective areas permeable only to regenerant.

FIG. 6 shows that tubes or similar delivery means 13 can provide for flow through vessel 10 of regenerant carrying fluid with suitable permeable portion 4 for example a membranous section of tubes allowing regenerant to enter a zone such as 6 whereas not passing into zones 5 or 7. Regenerants entering through conduit 1 and manifold 2 can leave through manifold 14 and conduit 15. Similar or other regenerants can also enter vessel 10 through conduit 9 and simultaneously or otherwise pass out of vessel 10 through conduit 8 when, for example, feed flow enters through conduit 8 and leaves through conduit 9. It is also possible that tubes or delivery system means such as 3, 12, 13 or the like can have a shape intermediate between "I" and "U", shown in FIGS. 2, 4, 6. For example a shape such as an "L" or a "Z" is also possible. As in embodiment shown in FIG. 4, embodiment of FIG. 6 allows for use of lower concentration of regeneration since an in-situ purification occurs in 4. Simultaneously, regenerant carrier fluids are transported without coming into contact with adsorber materials in 10.

Figure 7:
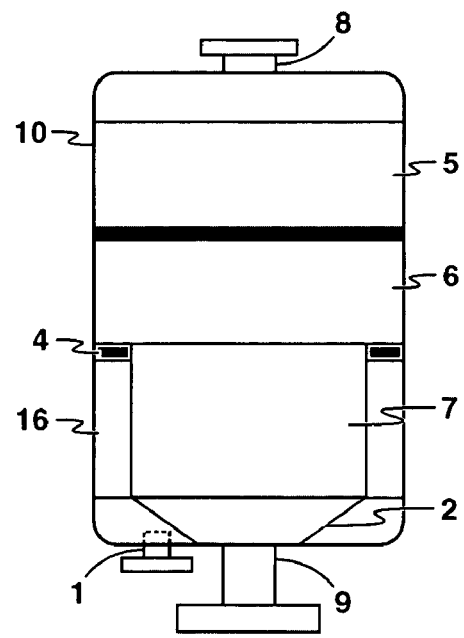
FIG. 7 is another embodiment where regenerant flows through an annulus.
Figure 8:
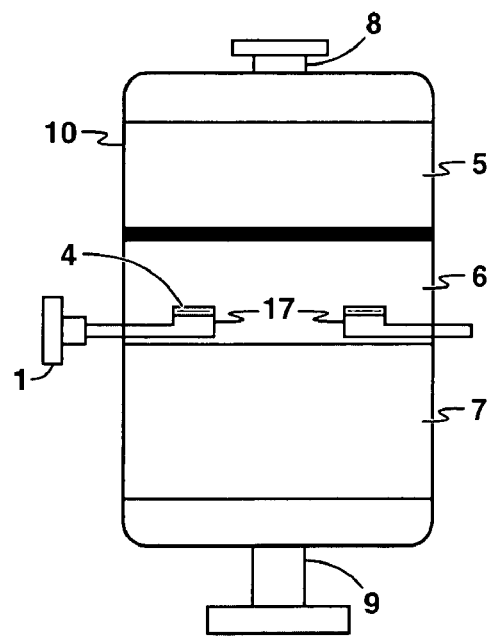
FIG. 8 shows another embodiment of placement of tubes to deliver regenerant to an adsorber.

FIG. 7 shows that an annular embodiment of bypass 16 through which regenerant that enters through conduit 1 can subsequently bypass adsorbent zone 7 and reach adsorbent zone 6 through permeable section 4. FIG. 8 shows an entry conduit 17 aligned substantially horizontally to vessel 10. Manifold or conduits such as 17 further disperse regenerants through specific zone 6 via selective permeable openings 4. In both FIGS. 7 and 8, similar or other regenerants can also enter vessel 10 through conduit 9 and simultaneously or otherwise pass out of vessel 10 through conduit 8 when, for example, feed flow enters through conduit 8 and leaves through conduit 9 in typical counter-flow. Co-flow combinations are also possible. Regenerant delivery structures (e.g. conduits 16 or 17) depicted in illustrations may be installed whole or if needed, assembled by fastening or joining their sections, prior to loading vessels with adsorbent materials. For example, these sections can be passed through any vessel openings that may be used for loading or unloading materials or for fluid entry and exit to vessels. In some embodiments, the design of the delivery structures may also permit a degree of freedom or flexibility. For example, the structures could be retractable or extendable or likewise flexible and of adjustable positioning means.

As noted above, by practice of the instant invention, it is possible to maintain a sulfur contaminant level of generally less than 300 ppmw. However, with increasing and varying strictness on sulfur contaminant levels permitted by purchasers, pipeline operators, governmental agencies, and the like, it is possible when practicing the instant invention to maintain sulfur contaminant levels of less than 200 ppmw, less than 100 ppmw, less than 30 ppmw, or even, at an optimum equal to or less than 10 ppmw.

The following examples utilize gasoline liquid as a hydrocarbon feed stream. The results are representative of the beneficial effects of the invention process since adsorption for gases or liquids are analogous. One significant difference in gasoline and natural gas, or other methane-rich hydrocarbon streams, is in the content of thiophenes. In gasoline the thiophenes represent nearly as much, or even more, sulfur contaminants as mercaptan, and other sulfur-containing compounds. Natural gas contains little, if any thiophenic sulfur compounds, e.g., less than about 10 ppmw, so the overall effectiveness of the sulfur removal adsorbents of the invention can be assessed without consideration of their effect on thiophene content. These examples are presented to illustrate the invention by analogy and are not to be taken as limiting in any way.

EXAMPLES

Examples 1-4

Example 1

A bed of fresh KF-752 consisting of 180 grams of hydrotreating catalyst KF-752, used as an adsorbent here, in a steel pipe of 1" nominal diameter and 22" length, was subjected to the feed consisting of gasoline containing 52 wt % aromatics, 25% paraffins with 12 wt % olefins and 58 ppmw total sulfur with 28 ppmw as mercaptans and 30 ppmw as thiophenes at a feed rate of 2.5 cc/min and a temperature of 100° F. (37.8° C.). The data of Ex. 1, Table 1 (below), shows a trace of the total sulfur effluent obtained from the column immediately after such treatment. Analyses were performed using a sulfur chemiluminescence detector (SCD) connected to a gas chromatograph (GC). Total sulfur trace from the experiment initially showed the thiophenic component including the characteristic plateau corresponding to the feed thiophenic sulfur level of 30 ppmw, after which the mercaptan sulfurs broke through. From this example it is seen that total sulfur stayed under 11 ppmw in the effluent for at least 360 minutes. In addition, mercaptan sulfurs remained under 5 ppmw for at least 1080 min. This indicates significant capacity of this material for mercaptan sulfurs.

Example 2

This example illustrates the advantages of using the proposed materials with hydrogen pre-treatment. A bed of fresh KF-752 (i.e. metal oxides only) was subjected first to a hydrogen pretreatment step at 600° F. (315.6° C.) and 200 psig (1379 kPa)) for 4 hrs. Subsequently it was subjected to the feed and conditions described in Example 1. It can be seen from this Example 2 that total sulfur stayed under 15 ppmw in the effluent for at least 960 minutes which is again indicative of the advantage of hydrogen pretreatment in developing capacity of these materials for trace sulfur compounds.

Example 3

This example illustrates the advantages of using the proposed materials in sulfided forms, which are typically how adsorbent materials are available for use in reaction catalysis and hydrotreating applications. A bed of sulfided KF-752 was subjected to the feed and conditions described in Example 1. Sulfided KF-752 was prepared separately using fresh KF-752 and hydrogen/$H_2S$ sulfiding mixture. The data of Table 1, Ex. 3, shows the trace of mercaptan sulfur obtained after the feed step of 24 hours was terminated. It is seen that mercaptan sulfur stayed under 6 ppmw for at least 1020 minutes. This shows the enhanced capacity of even the sulfided adsorbent as an adsorbent for mercaptan sulfurs. Adsorbents such as KF-752 are typically used in hydrotreating applications in their sulfided form, which promotes their activity. However, the example suggests that such materials, which could also be spent adsorbents, may still have enough activity and sulfur active sites to be an adsorbent for trace sulfur.

Example 4

This example also illustrates an embodiment of the invention using data obtained for a sequence of testing over 2 feed steps described by the cycle sequence: F1PF2 for a sulfided KF-752 adsorbent. Gasoline containing 52 wt % aromatics, 25% paraffins with 12 wt % olefins and 58 ppmw total sulfur with 28 ppmw as mercaptans and 30 ppmw as thiophenes, was passed over an adsorption bed in upflow mode consisting of 180 grams sulfided hydrotreating adsorbent KF-752 in a steel pipe of 1" (2.54 cm) nominal diameter and 22" (55.9 cm) length, at the rate of 2.5 cc/min at a temperature of 100° F. (37.8° C.) for a period of 24 hrs. This constitutes a first feed step (denoted F in the sequence) and is denoted by Ex. 3 in Table 1, below, which was discussed under Example 3 earlier.

The feed step was then terminated and a petroleum reformate (powerformate) regenerant containing 70 wt % aromatic and 30 wt % paraffins at 2.6 cc/min and 400° F. (204.4° C.) was then passed in downflow mode (i.e. counter-current to the feed step) over the bed. This powerformate regeneration step is denoted by P and lasted for 17 hours until all adsorbed sulfurs were cleaned from the bed and the concentration of sulfurs in the regenerant effluent was negligible.

The bed was then subjected to the feed in the upflow mode. This is denoted feed step 2, F2 in the sequence F1PF2. The corresponding effluent sulfur trace is in Ex. 4 of Table 1. It is seen that at 1320 minutes, less than 2 ppmw of mercaptan sulfur has emerged in the column effluent which indicates the beneficial nature of the regeneration applied. While several cycles of such testing may be needed to establish life of service, the results indicate that a sulfided adsorbent material containing only metal oxides and sulfides, assuming not all oxidic material was sulfided, can still be adequately regenerated with reformate to regain its capacity for mercaptan sulfurs.

TABLE 1

Effluent Data for Examples 1-4

| time min | Ex. 1 ppmw total S | time min | Ex. 1 ppmw mercaptan S | time min | Ex. 2 ppmw total S | time min | Ex. 3 ppmw mercaptan S | time min | Ex. 4 ppmw mercaptan S |
|---|---|---|---|---|---|---|---|---|---|
| 30 | 10.9 | 30 | 1.2 | 60 | 0.9 | 30 | 0 | 30 | 0 |
| 60 | 9.9 | 60 | 1.4 | 120 | 0.9 | 60 | 0 | 60 | 0 |
| 90 | 6.8 | 90 | 2.3 | 180 | 0.9 | 90 | 0 | 90 | 0 |
| 120 | 7.1 | 120 | 1.4 | 240 | 1.8 | 240 | 0 | 120 | 0 |
| 240 | 5.5 | 240 | 1.3 | 300 | 2.3 | 300 | 0 | 180 | 0.6 |
| 360 | 6.8 | 360 | 1.5 | 360 | 1.4 | 360 | 0 | 420 | 0.1 |
| 480 | 20.8 | 480 | 1.7 | 420 | 1.8 | 420 | 0 | 660 | 0 |
| 600 | 23.9 | 600 | 1.7 | 480 | 1.6 | 480 | 0 | 900 | 1.4 |
| 720 | 24.4 | 720 | 1.8 | 600 | 1.5 | 540 | 1.8 | 1140 | 1.3 |
| 840 | 31.3 | 840 | 2.9 | 660 | 7.7 | 660 | 1.4 | 1320 | 1.6 |
| 960 | 31.6 | 960 | 3 | 720 | 1.5 | 720 | 5.3 | | |
| 1080 | 31.9 | 1080 | 3.9 | 780 | 0.9 | 1020 | 4.3 | | |
| 1200 | 38.8 | 1200 | 5.4 | 840 | 13.1 | 1380 | 6.3 | | |
| 1320 | 41.1 | 1320 | 5.3 | 900 | 10.3 | 1440 | 9.4 | | |
| 1440 | 51.3 | 1440 | 5.3 | 960 | 13.1 | | | | |
| 1560 | 57.9 | 1560 | 6 | 1020 | 16.4 | | | | |
| 1680 | 59 | 1680 | 7.7 | 1080 | 23.4 | | | | |
| 1920 | 55.4 | 1920 | 9.1 | 1140 | 31.7 | | | | |
| 2160 | 52.4 | 2160 | 8.3 | 1260 | 52.3 | | | | |
| 2400 | 65.9 | 2400 | 8.9 | 1500 | 53.5 | | | | |
| 2640 | 60.1 | 2640 | 8.3 | | | | | | |
| 2880 | 61.5 | 2880 | 8.2 | | | | | | |

Example 5

Table 2, below, illustrates an exemplary embodiment of the invention using data obtained for cyclic adsorption and desorption of thiophenic and mercaptan sulfurs by fresh KF-752 in a sequence of testing over 5 feed steps described by the cycle sequence: FP-FH-FP-FP-F.

Gasoline containing 25 wt % paraffin, 12 wt % olefin and 52 wt % aromatics and laden with sulfur, comprising about 200 ppmw total sulfur (of which 70 ppmw is thiophene and 100 ppmw is mercaptan sulfur) was passed over an adsorption bed in upflow mode consisting of 180 grams hydrotreating adsorbent KF-752 in a steel pipe of 1" (2.54 cm) nominal diameter and 22" (55.9 cm) length, at the rate of 2.5 cc/min at a temperature of 100° F. (37.8° C.). This constituted a feed step (denoted F in the sequence). The feed step lasted until levels of total sulfur about 60-80 ppmw were detected in the effluent, using a sulfur chemiluminescence detector connected to a gas chromatograph. These effluent concentration profiles showed a characteristic plateau corresponding to the thiophene content in the feed. The feed step, step 1 in Table 2, was then terminated and powerformate regenerant containing 70 wt % aromatic hydrocarbons and 30 wt % paraffininic hydrocarbons at 2.6 cc/min and 400° F. (204.4° C.) was then passed in the downflow or counter-current direction over the bed. This powerformate regeneration step is denoted by P and lasted for 3 hours, until all adsorbed sulfurs were cleaned from the bed and the concentration of sulfurs in the regenerant effluent was negligible. The bed was then again subjected to the feed in the upflow mode. The effluent sulfur trace is marked step 2 in Table 2.

TABLE 2

Effluent Amounts for Example 5

| time min | step 1 ppmw Total S | time min | step 2 ppmw Total S | time min | step 3 ppmw Total S | time min | step 4 ppmw Total S | time min | step 5 ppmw Total S |
|---|---|---|---|---|---|---|---|---|---|
| 60 | 13.4 | 60 | 0 | 60 | 0 | 60 | 1.3 | 120 | 11.9 |
| 120 | 34.9 | 180 | 75.8 | 150 | 0 | 120 | 2 | 240 | 46.3 |
| 180 | 65.6 | 300 | 80.8 | 240 | 11.1 | 180 | 28 | 360 | 53.2 |
| 240 | 72.4 | | | 300 | 78.1 | 300 | 81 | | |
| 300 | 71.3 | | | 330 | 74.3 | | | | |
| 360 | 72.8 | | | 390 | 89.9 | | | | |

After the second feed step, the bed was subjected to counter-current gaseous hydrogen at the rate of 106 SCFD (2 SLPM), and at 200 psig (1379 kPa) and 700° F. (371.1° C.). This hydrogen regeneration step lasted for 3 hours with additional time of about 1 hour for heating up and cooling down. Subsequent to this step a feed step 3 was conducted and its effluent trace was measured for total sulfur and shown in step 3 of Table 2. Feed step 3 was then followed by a downflow powerformate regeneration step. After this step upflow feed step 4 was conducted (the total sulfur concentration trace for which is marked as step 4 in Table 2), followed by another powerformate regeneration step and feed step 5 with total sulfur concentration shown as step 5 in Table 2.

Example 6

This example tested the selectivity of KF-752 towards sulfur, i.e. comparative non-uptake of hydrocarbons such as olefins. Feed similar to that used in Example 1 was analyzed for olefin content and found to have a Bromine number of 19.8. This feed was passed over adsorbent KF-752 and the subsequent product bromine number was determined to be 18.5. This indicates that there was not a significant change in olefin content. The untreated feed was also passed over molecular sieve 4A zeolite and produced a product with Bromine number of 14.8. The lower Bromine number indicates that olefin content of the hydrocarbon stream is depleted due to the uptake of the olefins on the molecular sieve. This improved selectivity (preferential uptake of only sulfur species and minimal co-adsorption of heavy hydrocarbons such as olefins) is an advantage of the use of the inventive materials proposed here over conventional adsorbents such as molecular sieves for trace sulfur removal.

While the foregoing is directed to embodiments of the present invention, other and further embodiments of the invention may be devised without departing from the basic scope thereof, and the scope thereof is determined by the claims that follow.

We claim:

1. A continuous process for the removal of sulfur contaminants from a hydrocarbon stream, comprising:
   (a) providing a gaseous hydrocarbon stream having sulfur contaminants, but having less than 10 ppmw of said sulfur contaminants as thiophenes, to a bed of adsorbent material, said material having at least one Group VIII metal compound with at least one Group VI, IA, IIA, or IB metal compound on an inorganic metal oxide support material, at a temperature of up to about 150° C. and about 1 bar (100 kPa) to about 200 bar (20,000 kPa), without substantial added hydrogen, to adsorb said contaminants;
   (b) periodically stopping said providing of said gaseous hydrocarbon feed stream of (a) when said sulfur contaminants begin to increase in said treated gaseous hydrocarbon feed stream to a level not greater than 300 ppmw;
   (c) then, regenerating said adsorbent bed by introducing at least one regenerant, in any order, in the place of said stream, either in a concurrent or countercurrent direction, to at least said adsorbent bed for a period of time sufficient to regenerate a majority of adsorbed contaminates in the adsorbent material; and,
   (d) continuing to alternate (a) with (b) plus (c) as needed to maintain a sulfur contaminant level in said treated gaseous hydrocarbon feed of less than 300 ppmw.

2. The process of claim 1 wherein said stopping the stream of (a) is conducted when said contaminant-level increases to a level not greater than 100 ppmw, and said continuation of (d) is used to maintain a sulfur contaminant level of less than 100 ppmw.

3. The process of claim 1 wherein said regenerating of (c) includes at least one treatment with hydrogen at a temperature of from about 150° C. to about 500° C. at a pressure of form about 1 bar (100 kPa) to about 100 bar (10,000 kPa).

4. The process of claim 1 wherein the adsorbent bed of (a) has been pretreated with hydrogen, or a mix of hydrogen with hydrogen sulfide, or organic sulfide, at a temperature of from about 150° C. to about 500° C. at a pressure of from about 1 bar (100 kPa) to about 100 bar (10,000 kPa) before the providing of the gaseous hydrocarbon feed stream to the adsorbent bed.

5. The process of claim 3, wherein said adsorbent is a catalyst compound that has been previously used in a hydrodesulfurizing process with any essentially hydrocarbon feed stream, liquid or gaseous, containing sulfur contaminants.

6. The process of claim 1 wherein said bed comprises 1-25 wt. % cobalt oxide or sulphide compounds, 3-30 wt. % molybdenum oxide or sulphide compounds, both metal compounds adsorbed on one or more zeolite compounds comprised of alumina and silica.

7. The process of claim 6 wherein said zeolite compound has a surface area of from about 200 to about 800 $m^2/g$ and an average particle diameter of from 1.0 mm to 2.0 mm.

8. The process of claim 1 wherein said hydrocarbon stream flows at about 0.5-2 Giga-SCFD (566-2260 $kNm^3/hr$), or more.

9. The process of claim 1 additionally comprising passing said stream through a multi-bed reaction vessel, comprising at least one adsorbent bed of (a) and one or more other contaminant-removal beds of materials for the adsorption and removal of water, alcohol, oxygenate and nitrogenate contaminant compounds, said bed(s) being contiguous or separate from the at least one adsorbent bed(s) of claim 1, and each other if more than one.

10. The process of claim 9 where step (b) is carried out using at least one delivery by-pass system that delivers hydrogen directly to each of the one or more adsorbent beds of step (a) such that the hydrogen passes through the (a) bed(s) and is largely consumed therein.

11. The process of claim 10 where said delivery system comprises physical means that can be both substantially outside as well as substantially inside the contiguous or separate other bed(s) but constructed to restrict the hydrogen within it from coming into contact, either directly or indirectly, with said other beds.

12. The process of claim 10 where the delivery system has substantially impermeable surfaces that are in contact with surrounding materials of the beds and at least one surface with an adsorbent bed (a) that is permeable essentially only to hydrogen.

13. The process of claim 12 where said permeable surface is a membrane fabricated from zeolite or palladium.

14. The process of claim 1, wherein the adsorbent material comprises Co—Mo.

15. An apparatus for the removal of contaminants from a hydrocarbon stream, comprising:
  (a) a vessel having at least first, second, and third zones, a gaseous hydrocarbon stream inlet, and a gaseous hydrocarbon stream outlet, wherein the gaseous hydrocarbon stream inlet is in fluid communication with each of the first, second and third zones and the gaseous hydrocarbon stream outlet; and
  (b) a regenerant stream inlet operably attached to at least one regenerant stream conduit having at least one opening in the second zone covered by a semi-permeable material, wherein the at least one regenerant stream conduit is substantially impermeable in each of the first and third zones.

16. The apparatus of claim 15, wherein the second zone comprises a bed of adsorbent material, said material having at least one Group VIII metal compound with at least one Group VI, IA, IIA, or IB metal compound on an inorganic metal oxide support material.

17. The apparatus of claim 16, wherein the semi-permeable material is substantially selectively permeable to hydrogen.

18. The apparatus of claim 17, wherein the at least one regenerant stream conduit comprises a manifold operatively connected to a plurality of tubes disposed throughout the vessel.

19. The apparatus of claim 17, further comprising a regenerant stream outlet, wherein the regenerant stream conduit comprises a first manifold operatively connected to at least one regenerant tube configured to pass through an initial zone, into the second zone, and return back through the initial zone into a second manifold, which is operably connected to the regenerant stream outlet, wherein the initial zone is one of the first and third zone, and wherein the portion of the at least one regenerant tube passing through the second zone comprises the semi-permeable material.

20. The apparatus of claim 19, wherein at least one of the first and third zones comprise at least two zones.

21. The apparatus of claim 17, wherein the regenerant stream inlet is aligned substantially horizontally to the vessel and the regenerate stream conduit passes directly into the second zone.

22. The apparatus of claim 15, further comprising at least one distributor plate in the vessel configured to support at least one of the at least first, second, and third zones.

23. The apparatus of claim 15, wherein the at least one regenerant stream conduit is retractable or extendable within the vessel.

* * * * *